May 3, 1949.　　　　　J. H. BOOTH　　　　　2,468,917
CONTROL SYSTEM
Filed Sept. 28, 1944
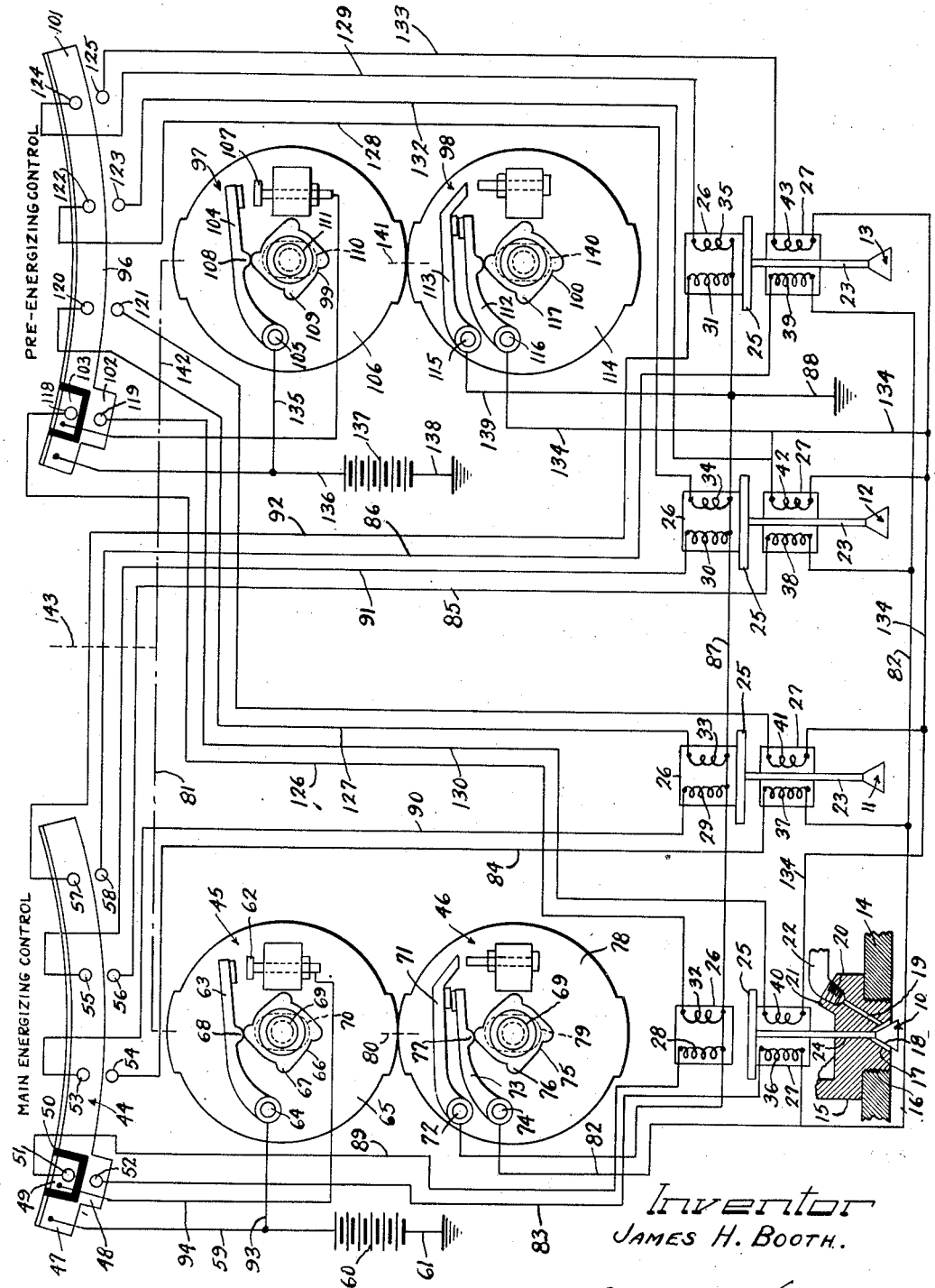
Inventor
JAMES H. BOOTH.

Patented May 3, 1949

2,468,917

UNITED STATES PATENT OFFICE 2,468,917

CONTROL SYSTEM

James H. Booth, Detroit, Mich., assignor to Thompson Products, Inc., Cleveland, Ohio, a corporation of Ohio Application September 28, 1944, Serial No. 556,195

5 Claims. (Cl. 175—335)

This invention relates to a fuel injection system and more particularly to the electrical control circuit for closing and opening the valve of a fuel injection system.

Many arrangements have been devised for metering and feeding fuel into the cylinders of an internal combustion engine. One of such types of system is known as a fuel injection system, and in such a system a metered quantity of liquid fuel under pressure is fed directly or through an intake manifold to each cylinder of the engine. Air is mixed with this metered quantity of fuel in the cylinder itself or in the intake manifold.

In my copending application for patent entitled "Fuel injection system," filed January 31, 1944, U. S. Serial No. 520,563, I have described and claimed a fuel injection system in which a novel electrical control circuit is arranged to cyclically energize and de-energize solenoids which are positive in their actuation of the fuel valve during the opening as well as the closing operation.

One of the principal features of the present invention is to provide an improved novel form of electrical control circuit and valve actuating means which is rapid and sure in operation and which is economical to manufacture.

A further object of the present invention is to provide a novel electrical means for opening and closing a valve of an internal combustion engine.

Another object of this invention is to provide novel electromagnetic means for actuating the valves of a fuel injection system.

Another and still further object of the present invention is to provide a novel electromagnetic means including a main energization circuit and a pre-energization system for the valve actuation mechanism of a fuel injection system.

Another and still further object of the present invention is to provide a novel control system for an internal combustion engine of the type in which a metered quantity of liquid fuel under pressure is fed directly through an intake manifold to each cylinder of the engine.

The novel features which I believe to be characteristic of my invention are set forth with particularity in the appended claims. My invention itself, however, both as to its manner of construction and method of control, together with further objects and advantages thereof, may best be understood by reference to the following description taken in connection with the accompanying drawing, in which the single figure thereof is a diagrammatic view of a valve control circuit for a fuel injection system embodying the novel features of the present invention.

Since the novel features of the present invention may best be exemplified by the particular electrical control circuit of the electromagnetic valve actuation mechanism, the details of the complete fuel injection mechanism have not been illustrated in the drawing. It will be understood, however, that the control circuit shown is arranged for controlling the opening and closing of the fuel injection valves of a four-cylinder internal combustion engine. It will further be understood that means associated with the timer of the internal combustion engine which controls the ignition system is provided for actuating the commutator mechanism and switches presently to be described for the control circuit of the valve actuation means.

As shown in the drawing, four fuel injection valves 10, 11, 12 and 13 are provided for the four cylinders of the motor whose fuel injection is to be metered and controlled thereby. A portion of the cylinder head and valve seat is shown in connection with valve 10 and includes a cylinder head wall portion 14 and a valve seat member or plug 15 which is threaded into the wall portion 14 as at 16. The valve seat member 15 is provided with a conical recess 17 which is complementary in shape to the shape of the valve head 18 of the valve 10. A metering orifice 19 extends through the valve seat member 15 into communication with the recessed chamber formed by the surface 17. This metering orifice 19 communicates with a socket portion 20 of a boss 21 to which the fuel supply line 22 is connected.

Each of the valves 11, 12 and 13 is provided with similar associated portions as just described in connection with valve 10, but for purposes of simplicity of illustration have been removed from the drawing.

Each valve 10, 11, 12 and 13 is provided with a valve stem 23 which slidably extends through an appropriate recess 24 in the valve seat member 15 opposite the inner end of the recess 17. The upper end of each valve stem 23 is provided with an armature 25 which is disposed in close proximity to an electromagnetic unit 26 on one side and an electromagnetic unit 27 on the other side. The electromagnetic units 26 are arranged to close the valves 10, 11, 12 and 13, while the electromagnetic units 27 are arranged to open the valves 10, 11, 12 and 13. The magnetizing units 26 contain main solenoid windings 28, 29, 30 and 31 which are associated with the valves 10, 11, 12 and 13 respectively. These windings have a relatively large number of turns and produce a relatively strong magnetic field when energized. The magnetic units 26 also include solenoid windings 32, 33, 34 and 35 associated with the valves 10, 11, 12 and 13 respectively, and these solenoids have relatively few turns and produce relatively weak fields when energized. Similarly, the magnetic units 27 include solenoid windings 36, 37, 38 and 39 associated with valves 10 to 13 respectively and also a second set of solenoid windings 40, 41, 42 and 43 associated with valves 10, 11, 12 and 13 respectively. The windings 36 to 39 are similar in character to the windings 28 to 31 and are arranged to produce relatively strong magnetic fields when energized. The windings 40 to 43 are similar to the windings 32 to 35 and are arranged to produce relatively weak magnetic fields when energized.

The windings 28 to 31 are the main operating coils for closing the valves 10 to 13 respectively, while the coils 36 to 39 are the main operating coils for opening the valves 10 to 13 respectively. The coils 32 to 35 and 40 to 43 are pre-energizing coils which reduce the opening and closing time periods of valves 10 to 13 by anticipating the load of the main energizing coils.

The energization of the windings 28 to 31 and 36 to 39 is controlled through a commutator 44 and a pair of switches 45 and 46. The commutator 44 has been developed in order to more clearly illustrate the operation thereof. It is to be understood, however, that the commutator 44 is in the form of an annular ring 47 of conducting material having an offset portion 48 located at one point in its periphery. Opposite the offset portion 48 is a conducting segment 49 which is separated from the main conducting ring 47 by insulation indicated at 50. Uniformly spaced around the circumference of the ring 47 are four pairs of contacting brushes 51—52, 53—54, 55—56 and 57—58. The brushes 51, 53, 55 and 57 are arranged to ride on the main portion of the conducting ring 47 as well as to ride on the conducting segment 49 when the same passes one of the brushes. It will further be observed that the brushes are wide enough so as to span the insulation opposite either end of the conducting segment 49 so there is no point where one of the brushes 51, 53, 55 and 57 is not in engagement either with the conducting ring 47 or the conducting segment 49.

The brushes 52, 54, 56 and 58 do not normally contact the conducting ring 47 but are arranged to extend into conducting relationship with the offset portion 48 of the conducting ring 47 whenever this offset portion 48 passes therebelow. While not shown, it will be understood that the conducting ring 47 and conducting segment 49 are rotated in the same manner as is the timer which is associated with the ignition system of the internal combustion engine.

The conducting ring is in continual engagement, through a conductor 59, with the high potential side of a battery 60. The low potential side of the battery 60 is grounded as at 61.

The switch 45 is a normally closed switch having a stationary contact 62 and a movable contact 63 which is pivotally mounted as at 64 on an adjustable plate 65. The movable contact arm 63 is arranged to be opened by a cam 66 having four lobe portions 67. These lobe portions 67 ride against an intermediate depending cam follower portion 68 formed on the movable contact arm 63. As one of the lobes 67 moves against the cam follower 68 the switch is opened. The cam 66 is preferably rotated at the same speed as the commutator 44 on shaft 69 (which shaft may also carry the commutator 44). The adjustable plate 65 has an oval opening 70 therein through which the shaft 69 projects. This plate 65 is arranged for limited movement to enable the relative position of the cam follower 68 to be varied with respect to the cam 66. This varies the length of time that the switch 45 is held open.

The switch 46 is a normally open switch having a yieldable contact arm 71 pivotally mounted as at 72 and a movable contact arm 73 which is pivotally mounted as at 74 on the adjustable plate 78. The movable contact arm 73 is arranged to be moved against the yieldable arm 71 by a cam 75 having four lobe portions 76. These lobe portions 76 are arranged to engage a cam follower 77 depending from an intermediate portion of the movable contact arm 73 and close this contact arm against the yieldable contact 71 each time one of the lobes 76 rides against the cam follower 77. The cam 75 is mounted on a shaft which is preferably the same shaft 69 on which cam 66 is mounted. The plate 78 on which the switch 46 is mounted is also provided with an oval opening 79 through which shaft 69 extends. This plate is mounted for limited movement to vary the relative position of the cam follower 77 with respect to the cam 75. This enables the time which the switch 46 is held closed by the cam lobe 76 to be manually varied. The two plates 65 and 78 are arranged to be moved together from one adjusted position to another. This is diagrammatically indicated by the broken line 80. The means for moving the plates is diagrammatically indicated by the broken line 81. As will presently be understood, this adjustable movement of the plates 65 and 78 provides the speed control for the motor.

The main energizing windings 36, 37, 38 and 39 for opening the valves 10, 11, 12 and 13 respectively, have their lower ends connected through a conductor 82 to the movable contact arm 73 of the switch 46. The opposite ends of these same coils are connected through conductors 83, 84, 85 and 86 respectively to brushes 52, 54, 56 and 58 of the commutator 44.

The main actuating windings 28, 29, 30 and 31 for closing the valves 10, 11, 12 and 13 are connected to a bus 87 which is grounded through a conductor 88. The opposite ends of these same coils are connected through conductors 89, 90, 91 and 92 to the brushes 51, 53, 55 and 57 respectively of the commutator 44. The movable contact 63 of the switch 45 is connected to the power supply conductor 59 on the high potential side of the battery 60 through a conductor 93. The stationary contact 62 of the switch 45 is connected through a conductor 94 to the conducting segment 49 of the commutator 44. The yieldable contact 71 of the switch 46 is connected through a conductor 95 to the grounded bus 87.

From the above description it will be understood that when the offset portion 48 of the commutator bar 47 moves into engagement with one of the brushes 52, 54, 56 and 58, the lower main actuating coil associated with that brush is placed in a condition where it will be energized upon closure of the movable contact 73 against the yieldable contact 71. Thus, the movement of the offset portion 48 into engagement with one of the brushes 52, 54, 56 or 58 does not of itself energize the lower actuating coil, for it is still necessary for the switch 46 to close. The closing and opening of the switch 46 is arranged to take place during the time that the offset portion 48 is in engagement with one of the aforementioned brushes.

Turning now to a consideration of the manner in which the main actuating coils are energized, it will be apparent that all of these coils are energized so long as the brushes 51, 53, 55 and 57 are in engagement with the commutator bar 47. As the conducting segment 49 moves into engagement with one of the brushes 51, 53, 55 and 57, the energization of the coil associated with that particular brush is now completed through the normally closed switch 45 rather than directly. When the cam 66 opens the normally closed switch 45 while a brush is in engagement with the conducting segment 49, the coil associated with that brush is de-energized. It will thus be understood that the movement of the commutator to a position where the conducting segment is placed into engagement with one of the brushes 51, 53, 55 and 57 does not, of itself, cause de-energization of the associated main actuating coil for closing a valve, but rather places it under control of the cam actuated switch 45. The opening of the switch and the subsequent closure thereof all takes place during a portion of the time that the conducting segment is passing across one of the brushes.

The main energization windings 28 to 31 for closing the valves 10 to 13 and the main energization windings 36 to 39 for opening the valves 10 to 13 are relatively heavy windings and establish a relatively strong magnetic field when energized. The pre-energization control windings 32 to 35 for exerting a force tending to close the valves 10 to 13, and the pre-energization control windings 40 to 43 which establish a field tending to open the valves 10 to 13 are relatively small windings and establish a relatively small magnetic field force as compared with the main windings previously referred to.

The energization of the windings 32 to 35 and 40 to 43 is controlled through a commutator 96 and a pair of cam actuated switches 97 and 98. The commutator 96 is driven in the same manner as the commutator 44. The switches 97 and 98, like the switches 45 and 46, are actuated by cams 99 and 100 which are rotated in the same manner as cams 66 and 75.

The commutator 96 includes a ring-shaped commutator bar 101 which is shown developed in the drawing for clarity of illustration. This bar is similar to the bar 47 of the commutator 44 and includes an offset portion 102 and a conducting segment 103 which is insulated from the conducting bar 101 and the offset portion 102.

The normally closed cam actuated switch 97 includes a movable contact arm 104 pivotally mounted as at 105 on an adjustable plate 106. It also includes a stationary contact 107. The movable contact arm 104 has a depending cam follower portion 108 which rides in engagement with the cam 99. The cam 99 is provided with lobe portions 109. The adjustable plate 106 is similar to the adjustable plate 65 and includes an oval opening 110 through which the cam shaft 111 of the cam 99 extends.

The normally open cam actuated switch 98 includes a movable contact arm 112 and a yieldable contact 113, which are pivotally mounted on an adjustable plate 114 at 115 and 116 respectively. The movable contact arm 112 includes a depending cam follower which rides in engagement with the cam 100. The cam 100 includes four lobe portions 117. The plate 114 is also provided with an oval opening 140.

Four pairs of commutator brushes 118—119, 120—121, 122—123 and 124—125 are associated respectively with the valves 10, 11, 12 and 13. The brushes 118, 120, 122 and 124 are disposed near the edge of the commutator bar 101 so as to ride in engagement therewith and also into engagement with the conducting segment 103 as the latter passes thereunder. The brushes 119, 121, 123 and 125 are disposed so as to be normally out of engagement with the conducting bar 101 but are arranged so that the offset portion 102 will successively pass into engagement with them.

The brushes 118, 120, 122 and 124 are connected through conductors 126, 127, 128 and 129 respectively to the upper end of the pre-energizing windings 32, 33, 34 and 35. The lower ends of these same windings are connected to the grounded bus 87. The brushes 119, 121, 123 and 125 are connected through conductors 130, 131, 132 and 133 respectively to the upper end of the pre-energizing windings 40, 41, 42 and 43. The opposite ends of these same windings are connected through a common conductor 134 to the movable contact 112 of the normally open switch 98. The yieldable contact 113 is connected to the grounded bus 87 through conductor 138. The movable contact 104 is connected through a conductor 135 and conductor 136 to the high potential side of a battery 137. The low potential side of the battery 137 is grounded through a conductor 138. While the battery 137 is shown as being separate from the battery 60, it will, of course, be understood that a single battery or source of potential may be employed without departing from the spirit and scope of the present invention.

The high potential side of the battery 137 is also connected through the conductor 136 to the commutator bar 101.

The plates 106 and 114 are mounted for movement together and this is diagrammatically indicated by the broken line 141. The means for moving the plates 106 and 114 is diagrammatically shown by the broken line 142. Since the pre-energization operation is directly tied into the operation of the main energization coils, all of the plates 65, 78, 106 and 114 should preferably move together. This is indicated diagrammatically by joining the broken lines 81 and 142 to a common actuating means shown by the broken line 143.

The operation of the commutator 96 and the cam actuated switches 97 and 98 in controlling the energization of the pre-energizing coils 32 to 35 and 40 to 43 is similar to that described in connection with the main energizing control and will therefore not be repeated except insofar as the relative timing of the pre-energization control is involved with respect to the main energizing control.

The timer cams 99 and 100 associated with the pre-energizing switches 97 and 98 are so positioned relative to the timer cams 66 and 75 that the energization of the pre-energizing coils takes place just prior to the energization of their respective associated main operating coils. Similarly, de-energization of the pre-energizing coils takes place just prior to de-energization of their respective associated main operating coils. Thus, when the valve 10 is in its closed position, the lower pre-energizing coil 40 is energized and the upper pre-energizing coil 32 is de-energized. A moment later, the lower main actuating coil 36 is energized and the upper main coil 28 is de-energized. Upon this latter operation the valve is moved to its open position. The initial energization of the pre-energizing coil 40 and de-energization of the coil 32 establishes a force which tends to open the valve 10 but due to the fact that the force exerted by the main coil 28 is very much greater than the pre-energizing coil 40 the valve remains in its closed position. After the valve 10 has been moved by the force exerted by both the main actuating coil 36 and the pre-energizing coil 40, and has remained open for a period almost equal to but slightly less than that necessary for introducing the desired metered quantity of fuel, the pre-energizing coil 32 is energized and the coil 40 is de-energized. Due to the fact that the force exerted by the coil 36 is very much greater than the force exerted by the coil 32 the valve remains in a stable and open position and a moment thereafter, however, the coil 36 is de-energized and the coil 28 is energized. The valve is then rapidly moved to a closed position by virtue of the force exerted by both the main coil 28 and the pre-energizing coil 32. The actuating coils associated with the valves 11, 12 and 13 operate in the same manner, the relative position of the commutators 44 and 96 being the means for determining which valve is being opened at any particular instant of time.

It has been found that an energizing circuit and actuating means of the type herein described cause much faster and efficient operation of the valves of an internal combustion engine of the type herein referred to. It is believed that this efficient operation is due to the fact that de-energization takes place faster than energization, and also to the fact that the force required to hold a valve in one of its extreme positions need not be as great as the force necessary to assure a very rapid movement of the valve from one position to another. In the present system a valve is moved from one position to another by the combined forces created by a relatively strong magnetic field and a relatively weak magnetic field. During the latter portion of the time in which a valve is in one of its extreme positions, the force holding it in that position is in effect the difference between the force exerted by a strong magnetic field operating to hold the valve in that position and the relatively weak force which tends to move it in the opposite direction. The use of pre-energization thus reduces the opening and closing time periods of the valves 10 to 13 by anticipating the load of the main energizing coils.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. An actuating mechanism for a member comprising electromagnetic, relatively strong means for holding said member in one position, electromagnetic, relatively weak means for preliminarily exerting a force tending to move said member from said one position to another position but insufficient to actually move said member, a second electromagnetic, relatively strong means operable in conjunction with said weak means to move said member after said weak means has initiated a force tending to move said member, said first strong means being rendered inoperative upon initiation of operation of said second strong means, a second electromagnetic, relatively weak means for exerting a force tending to return said member to its first position, said second weak means being rendered operative and said first weak means being rendered inoperative a predetermined time after said second strong means is rendered operative, and means for rendering said first strong means operative and said second strong means inoperative a predetermined time after said second weak means has been rendered operative.

2. An actuating mechanism for a member comprising electromagnetic means for exerting a relatively strong force and electromagnetic means for exerting a relatively weak force for holding said member in one position, a second electromagnetic means for exerting a relatively strong force and a second electromagnetic means for exerting a relatively weak force tending to move said member from one position to a second position, cycling means for deenergizing said first relatively weak means, and for energizing said second relatively weak means, means rendered effective by said cycling means a predetermined interval of time later for energizing said second strong means and deenergizing said first strong means, thereby to move said member to said second position under the joint action of said second strong means and said second weak means, means rendered effective by said cycling means a predetermined interval of time after said member has moved to its second position for energizing said first weak means and de-energizing said second weak means whereby said member is retained in its secured position by the differential action of said second strong means and said first weak means, and means rendered effective by said cycling means a predetermined interval of time after said member has moved to its second position for energizing said first strong means and deenergizing said second strong means, whereby said member is returned to its first position by the combined action of said first strong means and said first weak means.

3. A mechanism for moving a member having a magnetizable armature portion, said mechanism comprising a pair of electromagnets mounted in proximity to said armature for establishing a force when energized tending to move the armature in one direction, a second pair of electromagnets mounted in proximity to said armature for establishing a force when energized tending to move the armature in an opposite direction, each of said pairs of electromagnets including a relatively heavy winding and a relatively light winding, whereby the actuating forces established by the respective windings when energized are of different extent, a pair of normally closed cam actuating switches connected respectively between the two windings of one pair of electromagnets and a power supply, a pair of normally opened cam actuating switches connected respectively between the two windings of said other pair of electromagnets and said power supply, a timer means for actuating said switches connecting said power supply to said heavy windings substantially simultaneously and for actuating said switches connecting said power supply to said light windings substantially simultaneously but slightly ahead of the actuation of said switches connected to said heavy windings.

4. A mechanism for moving a member having a magnetizable armature portion, said mechanism comprising a pair of electromagnets mounted in proximity to said armature for establishing a force when energized tending to move the armature in one direction, a second pair of electromagnets mounted in proximity to said armature for establishing a force when energized tending to move the armature in an opposite direction, one electromagnet of each pair having greater ampere-turns than its associated electromagnet, a normally closed switch and a normally opened switch for connecting said electromagnets of greater ampere-turns respectively to a power supply, a normally closed switch and a normally opened switch for connecting said electromagnets of lesser ampere-turns respectively to said power supply, timer actuated means for moving said switches to their normally opposite position, the movement of said switches associated with said electromagnets of lesser ampere-turns taking place immediately prior to the movement of the other switches.

5. An actuating mechanism for sequentially moving a plurality of members having magnetizable armature portions said system comprising an electromagnetic actuating unit associated with each member, each of said units including a pair of electromagnets mounted in proximity to each armature for establishing a force when energized tending to move the armature in one direction, a second pair of electromagnets mounted in proximity to the same armature for establishing a force when energized tending to move that armature in an opposite direction, one electromagnet of each pair having greater ampere-turns than its associated electromagnet, a pair of normally closed switches and a pair of normally opened switches, timer driven commutator means for sequentially placing first one and then another of said electromagnetic actuating units under the control of said switches, each unit as it comes under the control of said switches having the two electromagnets of greater ampere-turns thereof connected through a normally closed switch and a normally opened switch and having the two electromagnets of lesser ampere-turns of the same unit connected through a normally closed switch and a normally opened switch, and timer actuated means for moving said switches to their normally opposite positions, the movement of said switches associated with the electromagnets of lesser ampere-turns taking place immediately prior to the movement of the other switches.

JAMES H. BOOTH.

REFERENCES CITED

The following references are of record in the file of this patent:

UNITED STATES PATENTS

| Number | Name | Date |
| --- | --- | --- |
| 252,927 | Burke | Jan. 31, 1882 |
| 1,038,598 | Kellum | Sept. 17, 1912 |
| 1,059,604 | Gaff | Apr. 22, 1913 |
| 1,684,603 | Stephenson | Sept. 18, 1928 |
| 1,711,660 | Stephenson | May 7, 1929 |
| 1,991,807 | Kriechbaum | Feb. 19, 1935 |
| 2,068,682 | Keefe | Jan. 26, 1937 |
| 2,089,279 | Loeffler | Aug. 10, 1937 |
| 2,155,272 | Jones | Apr. 18, 1939 |
| 2,226,856 | Gunter | Dec. 31, 1940 |
| 2,415,886 | Jones | Feb. 18, 1947 |